A. E. CARR.
ADJUSTABLE PLATE FOR FIXING SMALL VALVE RESEATING MACHINES ON LARGE VALVE CASES.
APPLICATION FILED DEC. 27, 1909.

981,747.

Patented Jan. 17, 1911.

Witnesses:
W. Ellwood Allen
L. B. Middleton

Inventor.
Alexander E. Carr,
by Herbert W. T. Jenner.
Attorney.

UNITED STATES PATENT OFFICE.

ALEXANDER ERNEST CARR, OF KINGSTON-UPON-HULL, ENGLAND.

ADJUSTABLE PLATE FOR FIXING SMALL VALVE-RESEATING MACHINES ON LARGE VALVE-CASES.

981,747.

Specification of Letters Patent.

Patented Jan. 17, 1911.

Application filed December 27, 1909. Serial No. 535,166.

*To all whom it may concern:*

Be it known that I, ALEXANDER ERNEST CARR, a citizen of Great Britain, residing at 63 Constable street, Hessle Road, Kingston-upon-Hull, England, have invented certain new and useful Improvements in Adjustable Plates for Fixing Small Valve-Reseating Machines on Large Valve-Cases; and I do hereby declare the following to be a full, clear, and axact description of the invention, such as will enable others skilled in the art to which it appertains to make and use the same.

My invention relates to the fixing or securing to valve casings of valve truing or re-facing machines of the kind which true or re-face the valve seats without such seats being taken from the casing, and the object of my said invention is to provide improved means whereby a small size of re-seating machine can be applied to different sizes of valve casings and so obviate the necessity for employing different sizes of machines for small and large work, my improvements allowing of the larger sized machines being entirely dispensed with.

Figure 1:
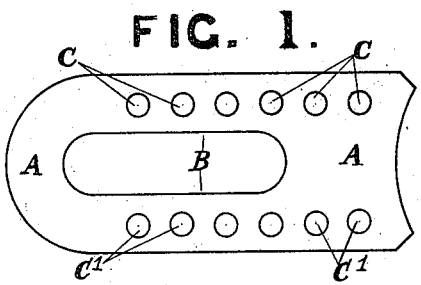
Figure 2:
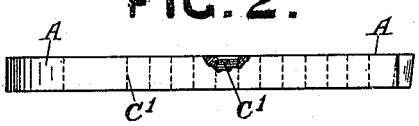
Figure 3:
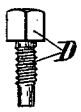
Figure 4:
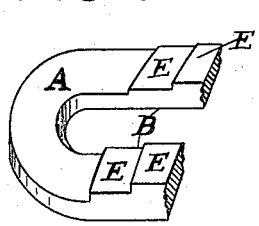
Figure 5:
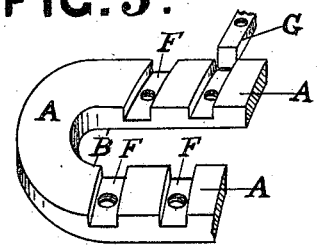
Figure 6:
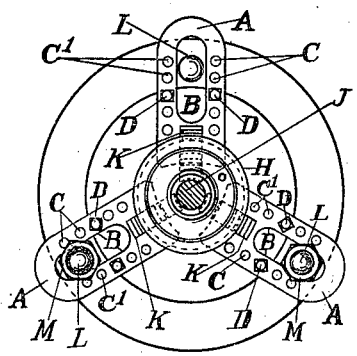
Figure 7:
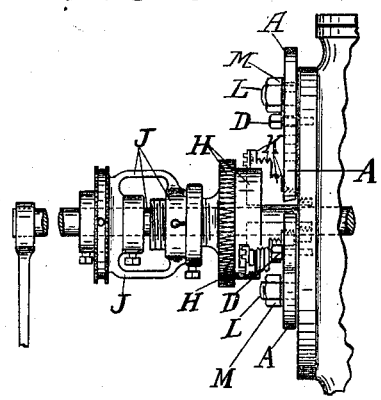

In the accompanying drawings which illustrate my invention:—Figure 1 is a plan view of one of my fixing plates; Fig. 2 is a side view of same; Fig. 3 is a view of one form of stud for assisting in preventing movement of the plates when fitted; Figs. 4 and 5 are broken perspective views of the underside of modified forms of plates; Fig. 6 is a front view of part of a valve casing with the plates in position holding the valve truing or re-facing machine, and Fig. 7 shows the arrangement in side view. Figs. 6 and 7 are drawn to a smaller scale than the preceding figures.

According to this invention, I employ a plurality of loose flat plates A of mild steel or other suitable metal for securing the machine to the valve casing. Each plate A may have an elongated hole B in it for bolts to pass through for bolting it to the valve casing, or such hole may be dispensed with and the plate be secured to the casing by clamps or other suitable devices; and each plate may be provided with a plurality of holes C and C', or a number of sets of such holes, to receive threaded studs D, such as that shown at Fig. 3, or pegs or the like, such studs, pegs or the like passing through to the underside where they project a suitable distance and form projections to bear on the inside edge of the valve casing when the plates are placed in position; but in place of these holes and studs, pegs or the like, the plates may have steps E on their underside as shown at Fig. 4 of the drawing, or they may have dovetail or other grooves F in them to receive strips of metal G of a greater depth than the grooves so that they project below the face of the underside of the plate A, as shown at Fig. 5 of the drawings, such strips being secured in position by wedging in the grooves, or by screws or other suitable means, and being placed in different grooves to suit the inside diameter of the valve casing.

The inner end of each plate A is by preference in the form of a segment of a circle to allow it to fit the chuck H of the machine J, and is preferably beveled or of tapering form to enable it to engage more perfectly with the jaws K of the chuck if such jaws are serrated or threaded as is generally the case.

When it is required to fix a machine in position for the purpose of truing or re-facing a valve seat, the plates A are placed with their inner ends against the jaws of the machine chuck, the number of plates employed corresponding with the number of jaws of the chuck. The plates A are then set to the necessary position to bring the spindle of the machine to the exact center of the valve casing, by means of the studs, pegs, steps, or projecting strips or the like, which pass to, or are on the underside of the plate, which can be so set, or are so formed or arranged that one or other set will fit up to and bear against the inside edge of the valve casing, depending upon the diameter of such casing, after which the plates are secured to the valve casing by means of the bolts L and nuts M which are employed for securing the valve cover to the casing, the bolts passing up through the elongated hole B in the plate A and the nuts screwed on the bolts to hold the plates in position (or such plates are secured by clamps or other suitable means) with the result that the machine is held perfectly immovable and can be operated without the slightest liability of its slipping and of the spindle moving from its true center.

Having thus described my invention, what I claim as new, and desire to secure by Letters Patent is:—

Clamping devices for securing a valve seating machine to a valve-casing, comprising a series of flat plates, each plate being provided with a jaw at one end for engaging with the chuck of the said machine and having a longitudinal slot at its middle part, each plate having also two rows of screw threaded holes arranged one on each side of the said slot, set-screws engaging with the said holes and adapted to bear against the valve casing, and bolts for engaging with the said slots and securing the said plates to the valve-casing.

In testimony whereof I affix my signature, in presence of two witnesses.

ALEXANDER ERNEST CARR.

Witnesses:
  LOUIS E. KIPPAX,
  ALBERT WYER.